June 17, 1930.  J. L. DRAKE  1,763,689
COOLED ROLL FOR PRODUCING SHEET GLASS
Filed Sept. 21, 1927
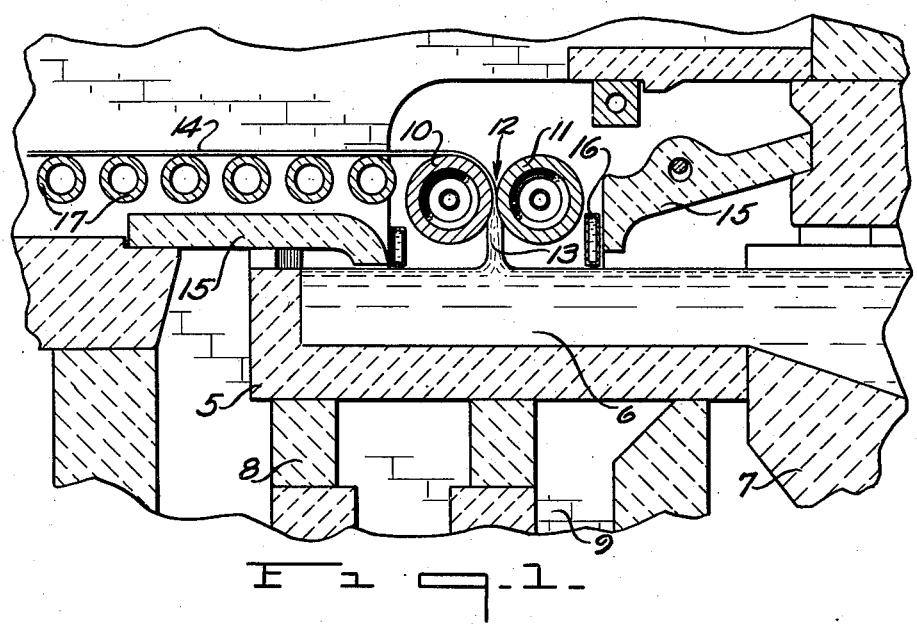
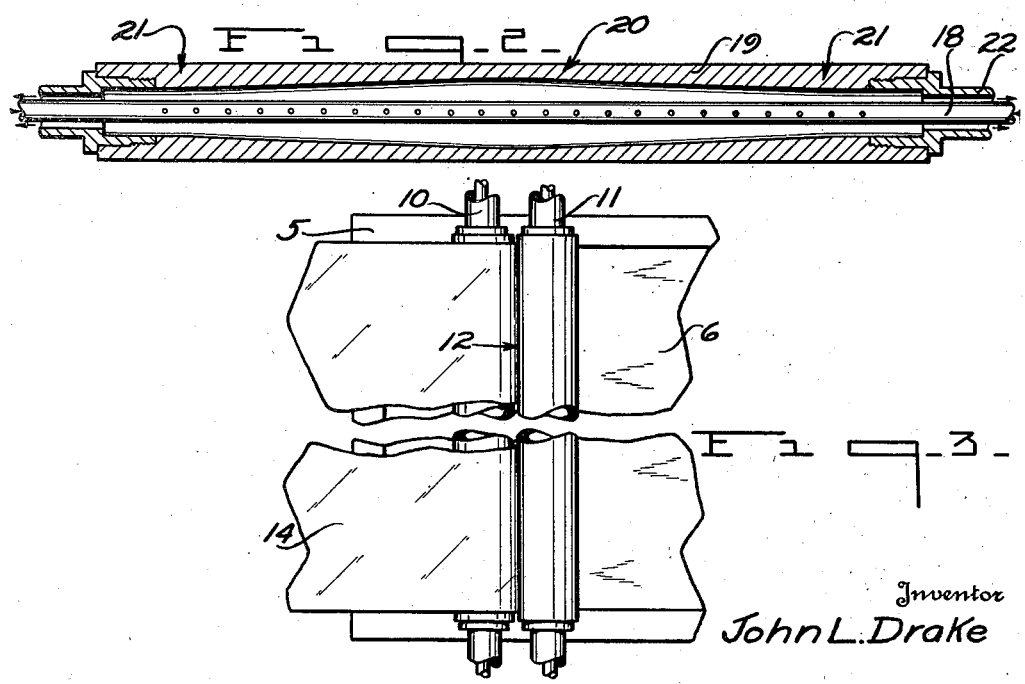
Inventor
John L. Drake
By Frank Fraser
Attorney Patented June 17, 1930

1,763,689

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

COOLED ROLL FOR PRODUCING SHEET GLASS

Application filed September 21, 1927. Serial No. 220,911.

The present invention relates to a process and apparatus for producing sheet glass.

An important object of the invention is to provide a process and apparatus for producing sheet glass wherein a mass of molten glass is rolled into a sheet of predetermined thickness, the means by which the mass is rolled being designed to absorb relatively more heat centrally from the mass of glass than at its border portions.

Another object of the invention is to provide in sheet glass apparatus, a receptacle containing a mass of molten glass, and a pair of rolls mounted thereabove and arranged to create a sheet forming pass, the wall of each roll being relatively thinner at its center than at its ends.

A further object of the invention is to provide in an apparatus of this nature, a pair of rolls mounted above a mass of molten glass and arranged to create a sheet forming pass whereby a relatively thick mass may be provided to the pass and reduced to a sheet of predetermined thickness, each roll having means associated therewith whereby a temperature control medium may be circulated therethrough, the wall of each roll being thinnest at its center and becoming gradually thicker as it reaches the ends of the roll.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through a portion of a machine illustrating my improved construction, Fig. 2 is a vertical longitudinal section through a roll formed in accordance with this invention, and Fig. 3 is a plan view of the apparatus.

This invention relates particularly to the type of machine disclosed in the application of Drake and Mambourg, Serial No. 214,278, filed August 20, 1927.

The numeral 5 designates a draw-pot or working receptacle containing a mass of molten glass 6 which may be furnished from any desirable form of glass melting furnace 7. The pot 5 may be supported on spaced stools 8 arranged in a heated compartment 9, which compartment is provided to assist in controlling the temperature of the molten glass.

A pair of rolls 10 and 11 respectively are mounted above the surface of the molten mass 6 and are arranged to create a sheet forming pass 12. Upon rotation of the rolls 10 and 11, and proper handling of the mass 6, a relatively heavy body of glass 13 is moved upwardly and furnished to the forming pass 12. The mass of glass 13 will then be rolled into a sheet 14 having a substantially predetermined thickness, the sheet preferably being deflected into a horizontal plane over the roll 10. Lip tiles 15 and heat absorbing shields 16 may be used to protect the mass 13, rolls 10 and 11, and the sheet 14. A plurality of rolls 17 may be arranged as shown in Fig. 1 to support and convey the sheet in its horizontal run and are preferably driven in a manner to place the sheet under a slight tension to prevent sagging of said sheet between the rolls.

The mass of molten glass 13 is supplied from a receptacle having substantially the same width as the sheet produced. Due to heat losses by radiation along the border portions of the supplying source 6, the border portions of the mass 13 will be relatively colder than the central portion thereof. To compensate for the differential in heat temperatures throughout the entire width of the mass 13, and to allow the production of a uniform sheet of glass, I construct the rolls 10 and 11 in a manner that relatively more heat will be absorbed from the glass centrally thereof than at the border portions. Sufficient heat is absorbed from the central portion of the sheet that the sheet formed from the mass 13 will be substantially uniform in temperature throughout its entire width.

Referring to Fig. 2, it will be seen that a perforated conduit 18 extends through the roll 19 which is representative of the rolls 10 and 11. The bore of the roll 19 is of such a configuration that the wall of the roll 19 will be thinner at its center 20 than at its ends 21. The reduction in thickness of the wall of the roll is gradual as shown in Fig. 2 so that the absorption of heat from the mass of glass 13 becomes progressively less from the center of the roll toward the ends thereof. A suitable temperature control medium is preferably introduced at both ends of the conduit 18 simultaneously and allowed to discharge within the roll and then passed therefrom at both ends as indicated by the arrows. The conduit 18 may be mounted on a stationary bracket while the roll may rotate thereabout, sufficient room being left between the ends 22 of the roll and the conduit 18 to permit the escape of the used temperature control medium.

Although the temperature of the mass of glass 13 is not uniform throughout its entire width, the rolls creating the sheet forming pass are of such a nature that the sheet 14 will be of substantially uniform temperature throughout its entire width. As above pointed out, the central portion of the glass moving into the mass 13 is relatively hotter than the remainder thereof, and in fact the temperature of the glass is progressively less from the center of the mass toward both ends thereof. However, the thickness of the walls of the rolls is such that the temperature of the glass will become equalized after contact with said rolls. A uniform temperature condition is desirable because it assists in the formation of a flat sheet of uniform thickness, and also facilitates proper annealing of the sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:
1. In sheet glass apparatus, a roll having an opening therethrough, said opening being of such a nature that the wall of the roll becomes progressively thicker from its center toward both ends thereof.

2. In sheet glass apparatus, a roll having an opening therethrough, said opening being of such a nature that the wall of the roll becomes progressively thicker from its center toward both ends thereof, and means for passing a temperature control medium through said roll.

3. In sheet glass apparatus, a roll having an opening therethrough, said opening being of such a nature that the wall of the roll becomes progressively thicker from its center toward both ends thereof, and means for simultaneously introducing a temperature control medium through both ends of said roll.

Signed at Toledo, in the county of Lucas and State of Ohio, this 19th day of September, 1927.

JOHN L. DRAKE.